Feb. 6, 1934.   A. O. JAEGER   1,945,811
CONTACT SULPHURIC ACID PROCESS
Filed Feb. 20, 1930
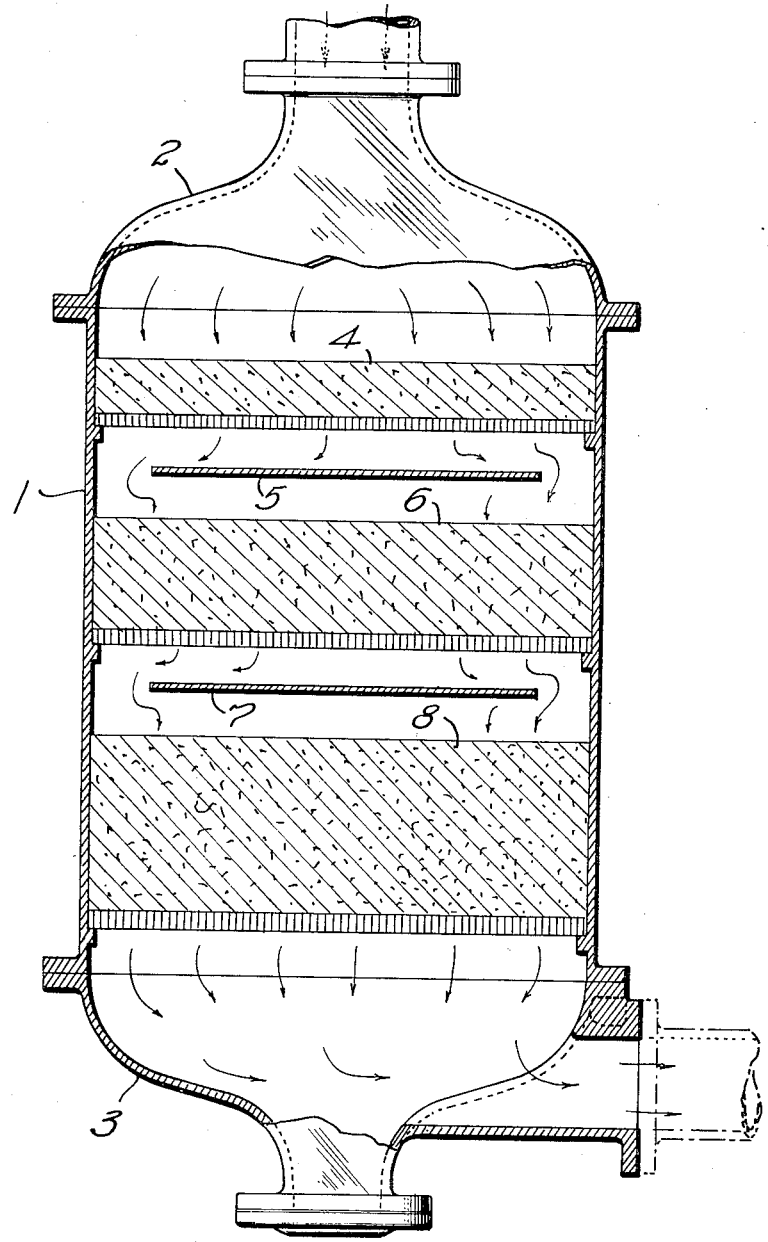
INVENTOR.
Alphons O. Jaeger,
BY Robert Ames Norton
ATTORNEY.

Patented Feb. 6, 1934

1,945,811

UNITED STATES PATENT OFFICE 1,945,811

CONTACT SULPHURIC ACID PROCESS

Alphons O. Jaeger, Mount Lebanon, Pa., assignor to The Selden Company, Pittsburgh, Pa., a corporation of Delaware Application February 20, 1930. Serial No. 430,129

3 Claims. (Cl. 23—176)

This invention relates to the contact sulphuric acid process and more particularly to the contact sulphuric acid process with non-platinum catalysts of high overload capacity.

Up to about four years ago the contact sulphuric acid process was carried out practically exclusively on a commercial scale with platinum catalysts and in general two types of converters were used.

One is the ordinary Grillo or tray type converter in which the cooling is by radiation from the converter shell and the catalyst is placed in a small number of relatively thick layers or trays, the partly reacted gases being brought into contact with the converter shell and permitted to cool between layers. Modifications have, of course, been made using two or more Grillo converters in series with an interposed heat exchanger and also the use of positive heat exchangers between layers inside of the converter shell. This latter construction is shown in United States Patent No. 1,099,530.

The second type of converter is, for example, illustrated by the Knietsch converter, a number of modifications of which are shown in United States Patent Number 688,020. In these converters a direct cooling of the catalyst is employed for even temperature control, but the converter is expensive to build and presents serious maintenance troubles.

In the United States Patent No. 1,660,511 to A. O. Jaeger, converter systems are shown in which the first converter contains heat exchange elements embedded in the catalyst, giving a very accurate temperature control. While cheaper and more effective than the Knietsch converter, the Jaeger converter systems are more complex and expensive to build than the simple tray type converter which has been used with platinum.

The control of temperature with fluctuations of reaction gas velocity and concentration in a tray type converter is fairly satisfactory with a platinum catalyst because of the low overload capacity of platinum. The contact sulphuric acid process is not highly exothermic, although the exotherm is quite considerable, and being an equilibrium reaction a rise in temperature above 400° C. decreases the conversion equilibrium, at first slowly and later more rapidly; thus, an overload which would result in a sharp increase in temperature would lower the conversion and hence the heat evolved, and if the temperature is permitted to go sufficiently high, of course, an equilibrium would be reached since the reverse reaction, that is to say the breaking up of $SO_3$ into $SO_2$ and oxygen, absorbs just as much heat as the oxidation of $SO_2$ gives off. This factor alone cannot be used to regulate the temperature of a Grillo converter except in unusual cases where very dilute gases are used since the temperature, if the catalyst does not lose activity with overload, would rise high enough to damage the apparatus and in most cases to ruin the catalyst. However, with platinum catalysts a second factor enters in, namely, the low overload capacity of platinum. If one takes the standard platinized magnesium sulphate catalyst, using 7% burner gases, the normal loading is 135 liters of gases per hour per 200 c.c. of contact mass. Under this loading the platinum catalyst gives close to theoretical equilibrium, that is approaching 97% for a perfectly fresh catalyst. In ordinary operation, of course, the conversions are not as high, running about 96% or less. An increase in loading rapidly results in a decrease in conversion because the platinum is not sufficiently active to stand the heavier loading and the conversion curve, therefore, drops off quite rapidly. It will be apparent that this results in an automatic regulation irrespective of the thickness of the contact mass layer in the tray, since if the loading increases, which ordinarily would result in the evolution of more heat, not only will the increase in temperature decrease the conversion but the increase in loading will likewise decrease the conversion, and this latter factor operates sufficiently rapidly so that dangerous temperatures are not obtained with a platinum catalyst. In fact so rapid is the falling off in conversion with increase of loading that in the standard platinum Grillo converter if the temperature rises higher than that desired for best operation this is corrected by an increase in the amount of gases passed through. In other words, the converter is actually overloaded to cool the catalyst layers which first encounter the gases and of course accidental overload will not endanger the catalyst or the converter. The same factor which automatically sets a limit to the temperatures obtained, of course, is one of the many drawbacks of platinum catalysts, since when larger production is desired it cannot be obtained with adequate conversion yields. In other words the platinum catalyst is not flexible and has but little overload capacity.

The sporadic attempts, for the most part not extending beyond the laboratory, to use vanadium catalysts do not present any serious problems because even with the few vanadium catalysts which give initial conversion approaching platinum the capacity of the catalyst on overload was in almost all cases about the same as platinum, and as the catalyst was extremely sensitive to heat the temperature could not be permitted to rise. No serious problem, therefore, arose with vanadium catalysts because none of them were sufficiently active and possessed sufficient life to be practically used on a commercial scale for anything except emergency operation.

In 1926 the first of the modern, high efficiency vanadium catalysts appeared in the industry in the United States, namely, the diluted vanadium pentoxide zeolites described in the patent to Jaeger et al, No. 1,657,754, which was shortly followed by the even more efficient vanadium-containing non-siliceous base exchange bodies described in the Jaeger Patent Number 1,675,308. These catalysts, and particularly those last referred to, showed activities under commercial loading better than the best platinum catalysts and possessed the surprising property of enormous overload capacity, coupled, especially in the case of the best non-siliceous base exchange body catalysts, with an excellent resistance to high temperatures. Full scale commercial tests with a vanadium-containing non-siliceous base exchange body contact mass showed at the standard loading for platinum, namely, 135 liters of 7% burner gases per hour per 200 c.c. of contact mass, conversion efficiencies up to 98.8%. An increase in loading to 150 liters per hour, which would begin to show a drop with platinum catalysts, showed no drop whatever with the vanadium non-siliceous base exchange body. Even at 200 liters' loading, the drop in conversion efficiency was so small as scarcely to exceed the experimental error, and at 300 liters loading, which would correspond to an enormous drop with platinum, the decrease in conversion efficiency with the vanadium-containing non-siliceous base exchange body was less than 1%.

The extraordinary behavior of these modern complex, high efficiency vanadium contact masses presented an entirely new problem of temperature control, one which never arose with platinum contact masses used in the past. The vanadium masses which are used effectively in the standard large scale installations today employ converter systems with positive cooling of the catalyst such as those described in the Jaeger Patent No. 1,660,511, and with the powerful temperature control of these converter systems the enormous efficiency of the modern vanadium contact mass can be fully utilized and tremendous overload factors can be taken advantage of. For some purposes, and especially where total conversion efficiency of a complete converter system is of smaller importance, as, for example, in plants using waste gases from the smelting of ores and in plants using cheap sources of sulphur such as various pyrites ores, it is desirable to cut the cost and reduce the complication of the converter system to the limit, and where maximum conversion efficiency of the whole system is not of prime importance there is some advantage in using a Grillo or tray type converter from the standpoint of back pressure in the system and hence power consumption, and from the standpoint of cheapness and ease of catalyst replacement. Experiments with the highly efficient base exchange vanadium contact masses in the standard Grillo converter for platinum have proven to be comparatively unsuccessful because unless the control is very accurate there is a serious tendency to overheat as a result of the enormous overload capacity of the contact mass. Damage to the converter and even in some cases to the contact mass may result, for great as is the resistance to high temperature of the best modern base exchange catalysts even they cannot withstand indefinitely high temperatures, and for this reason the Grillo type of converter has been considered unsuitable for use with modern vanadium contact masses.

According to the present invention an additional factor in the kinetics of the reaction is utilized in order to obtain control of the reaction in a tray or Grillo type converter. While the modern vanadium contact masses have enormous overload capacity, considering the converter system as a whole, they nevertheless require an appreciable amount of contact time with the reacting gases even though this time of contact appears to be considerably smaller than with platinum, which is one of the factors accounting for the high overload capacity. Nevertheless, the reaction is not instantaneous and by sufficiently reducing the contact time in certain portions of the converter, particularly the layers or trays which encounter the fresh reaction gases, an automatic control of maximum temperature is obtained, for overloading then decreases the contact time and results in a proportional decrease in conversion in the particular tray. To achieve this desired control it is necessary to have the tray or layer sufficiently thin so that at normal operation the contact time is just sufficient or not greatly more than sufficient to permit the desired percentage of total conversion in the particular layer. Of course the successive layers can become progressively thicker since the reaction time required becomes progressively longer as the gases react and the concentration of oxygen and sulphur dioxide progressively decreases. The gases are cooled between passages through the layers as is the standard arrangement in Grillo converters, therefore the gases striking each layer are brought down to about the same temperature, and therefore, since there is no materially higher temperature the reaction speed decreases because the only factor being changed is the concentration of reacting gases.

The drawing illustrates in diagrammatic form a single typical Grillo converter embodying the invention. The figure is in vertical section.

The converter illustrated in the drawing consists of a shell 1, top piece 2, bottom piece 3 and three catalyst layers 4, 6 and 8. The catalyst layers are supported on screens and baffles 5 and 7 are placed between layers 4 and 6 and 6 and 8, respectively. The reaction gases, as shown by the arrows, pass downwardly through the converter, first through the thin catalyst layer 4, which is maintained sufficiently thin so that even with a vanadium catalyst of high overload capacity the time of contact is too short to permit excessive heating. The partly reacted gases leaving the layer 4 are forced by the baffle 5 into contact with the converter shell 1 where they are cooled by radiation from the said shell. The cooling gases then pass through the layer 6 which is of considerably greater depth than 4 and further reaction takes place. As the reaction velocity in the partly reacted gases is, of course, considerably less than in the fresh reaction gases the depth of the layer can be greater without permitting a contact time sufficiently long to result in excessive heating. After leaving the layer 6 the gases are again deflected against the converter shell by means of the baffle 7 and after cooling pass through the deep layer 8.

The drawing illustrates only a single Grillo converter. Normally in a large contact plant two or three Grillos are arranged in series with heat exchangers between the converters. As, however, the present invention is normally applied only to the first converter or if applied to the second converter, as it operates in the same manner, only the first converter of the system is illustrated.

The fact that it is necessary to use a larger amount of contact mass in the later portions of the converter, particularly when a converter system is used with a plurality of converters and a lower temperature is used in the second converter is, of course, well known and has been applied to some extent in Grillo converters using platinum, but with the ordinary low overload capacity of platinum and the extremely high price of the contact mass it has been the practice to provide sufficient contact mass in the portions of the system where maximum reaction velocity is obtained to assure handling maximum loads. This method of operation was, of course, satisfactory with platinum because no attention needed to be paid to the time of contact in the layers or trays encountering the fresh reaction gases or those only slightly reacted, since the tendency to rise in temperature with overloading was automatically kept in check by the low overload capacity of platinum as has been pointed out above.

The present invention depends on the elimination of sufficient overload capacity in the first layers, considering now not catalyst efficiency but contact time, so as to prevent excessive temperatures. With the present invention tray type converters can be used with the same safety and of course with enhanced efficiency than was possible with platinum, and the only field in the contact sulphuric acid process which had been in the main closed to the modern vanadium contact masses is opened to them by using the principles of the present invention. Another advantage of the present invention is that it is possible to directly replace platinum in converter systems using the tray type since it is an easy matter to reduce the thickness of the first few layers of contact mass to the point calculated to give the automatic control of maximum temperature.

The time of contact of the gases with the catalysts in any layer at any given loading, that is to say, total volume of gas per unit time per unit volume of catalyst, is dependent entirely on the thickness of the layer, and is not dependent on the horizontal area of the layer because the amount of catalyst and the amount of gases passing through at a given speed both increase in exactly the same proportion as the horizontal area of a catalyst layer increases, and since loading is volume of gas divided by volume of catalyst, it is not changed by changing the horizontal area of the catalyst layers, because both the numerator and the denominator of the fraction are changed by the same factor. For this reason, the contact time at a given loading depends only on the thickness of the layer, and therefore when the thickness is determined for a particular catalyst, it is applicable irrespective of the horizontal area of the layers.

The present invention is not directed to a particular catalyst layer thickness because this thickness will vary with different vanadium contact masses since, while it is characteristic of the high efficiency modern vanadium contact masses that they have enormous overload capacities, nevertheless there is a considerable variation in the activity of the different modern vanadium contact masses and the thickness of the first layer and such succeeding layers as would otherwise present the possibility of overheating is determined by two factors, one being the activity of the particular vanadium contact mass used, and the second, of course, being the concentration of gases used. The reaction velocity of a vanadium contact mass is, of course, calculable from simple laboratory experiments using different thicknesses and different gas velocities, and the present application does not claim the method of determining reaction velocities per se. This method in its general procedure is, of course, known, but it has never been utilized to determine the thickness of layers required for modern high efficiency vanadium contact masses.

The present invention is not directed to the use of any particular modern, high efficiency, vanadium contact mass, although it is particularly applicable to "permutogenetic" contact masses, such as those described in Patents No. 1,657,754, No. 1,675,308, No. 1,675, 309, No. 1,741,310 and No. 1,694,123, and application Serial No. 334,365. Such permutogenetic contact masses may be considered as the preferred high-efficiency contact masses for use in the present invention, which, however, is not limited thereto and is applicable to any high efficiency vanadium contact mass having an overload capacity greater than that of platinum.

While the maximum temperature which the catalyst may safely be allowed to reach depends to some extent on the nature of the catalyst itself, in general it is undesirable to operate with temperatures above 1200° F. in the hottest zone, and although the invention is in no sense limited to a layer thickness that will keep temperatures from substantially exceeding 1200° F. in the preferred embodiments of the invention the layer thickness, and therefore contact time, should be kept below that which will permit obtaining temperatures in excess of this temperature.

It should be understood that in calculating the contact time the temperature of the incoming reaction gases striking the first layer cannot be entirely neglected because the reaction velocity increases rapidly at higher temperatures, so that when unusually cold reaction gases are caused to contact with the first layer, provided of course they are at sufficiently high temperature for the reaction to start at all, the reaction will be relatively slow in the portion of the catalyst where the gases are being heated up, and the effective contact time at the higher temperatures which are reached after the gases are heated up is therefore less than the contact time corresponding to the same thickness of the layer in the case where reaction gases of higher temperatures are used to start with. This effective contact time is the factor of importance, of course, and calculations must be made with this in mind.

It should be understood that in the claims the expression "permutogenetic" is used to cover contact masses which when freshly prepared contain diluted or undiluted base exchange bodies, siliceous or non-siliceous, or their reaction products with anions capable of forming salt-like bodies with them or their leached derivatives. It should be understood that this type of contact mass is ordinarily calcined with air or acid gases before use, and even if not calcined as a result of the reaction itself, the base exchange body undergoes secondary transformation into products which likewise have a very favorable physical structure but do not possess the active base exchange power of the fresh products. Therefore, the expression "permutogenetic" is applied to the contact mass as freshly prepared before calcination, but, of course, does not apply to contact masses which may have been subjected to other chemical treatment which would completely change their chemical nature as defined above.

What is claimed as new is:

1. A method of catalytically oxidizing $SO_2$ to $SO_3$, which comprises passing a gaseous mixture containing $SO_2$ and oxygen over successive layers of a vanadium-containing contact mass having an overload capacity in excess of that of platinum contact masses, cooling the gases between successive layers, at least the first layer being of such thickness that the effective contact time of the gases passing therethrough is not sufficiently in excess of that required for the normal percentage conversion at normal operation to permit excessive heat evolution under overload and the latter layers are of sufficient thickness to permit commerically economical outputs per volume of catalyst.

2. A method according to claim 1, in which the thickness of at least the first layer is such that the effective contact time is not sufficiently in excess of that for normal conversion percentage at normal loadings to permit temperatures substantially in excess of 1200° F.

3. A method according to claim 1, in which the thickness in all the layers is such that the effective contact time is not sufficiently in excess of that for normal conversion percentage at normal loadings to permit temperatures substantially in excess of 1200° F.

ALPHONS O. JAEGER.